Sept. 28, 1965   F. BROUWER   3,209,152
PHOTOELECTRIC SCANNER FOR LINE TRACING
Filed July 28, 1960
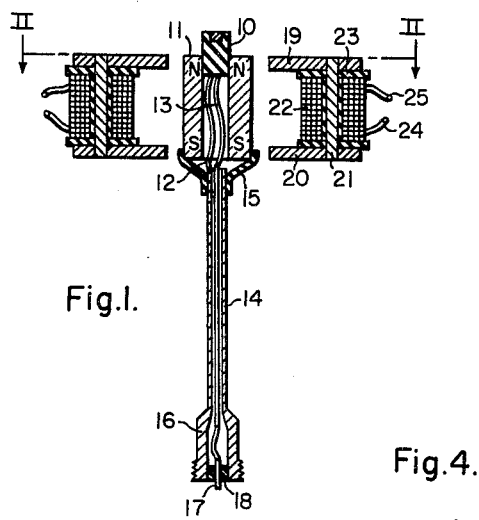
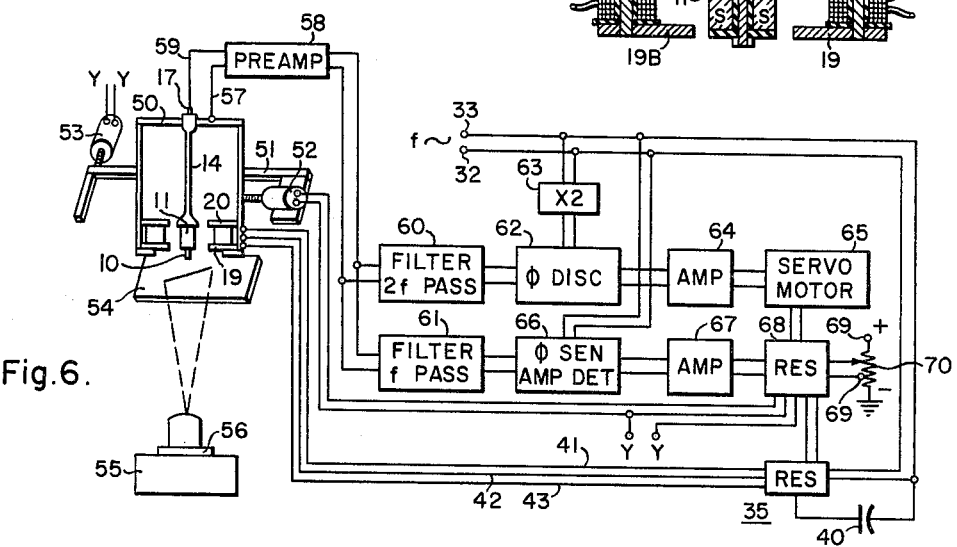

United States Patent Office 3,209,152
Patented Sept. 28, 1965

3,209,152
PHOTOELECTRIC SCANNER FOR LINE TRACING
Frans Brouwer, Glencoe, Ill., assignor to Canadian Westinghouse Company, Limited, Hamilton, Ontario, Canada
Filed July 28, 1960, Ser. No. 45,896
Claims priority, application Canada, Feb. 4, 1960, 791,831
11 Claims. (Cl. 250—202)

This invention relates to scanning devices and in particular to photoelectric scanning devices. In Patent 3,017,-552, granted Jan. 16, 1962 to the same inventor, a line tracing system is disclosed which utilizes a circularly scanning photoelectric scanning device. In operation the scanning device disclosed in this patent is arranged so that the photo sensitive device in effect observes the reflected light from a small area of surface and this small area is caused to move in a circular manner. The photo sensitive device therefore observes the reflected light from the surface around this circular path and is thereby capable of determining the position of a line, which has a different reflective characteristic than the surface, relative to the center of rotation of the circle scanned.

In the apparatus disclosed in the patent there is a mirror in the optical path between the area scanned and the photosensitive device. This mirror is arranged to rotate in such a manner as to cause a rotary motion of the optical path and thus cause the photo sensitive device to effectively scan a circular track. While the apparatus disclosed in this patent has been found to operate satisfactorily, there are certain shortcomings which should be overcome. One objection to the prior scanning device is that its optical path may be inefficient. If the contrast between the line and the surface is not great it is possible that the derived signal may be too small to achieve the desired sensitivity. The optics of the device also results in increased cost of the apparatus.

It is an object of this invention to provide a new and improved photoelectric scanning device. It is a further object of this invention to produce a simplified photoelectric scanning device. In general these objects are attained by resiliently mounting the photoelectric device and fastening to it rigidly a permanent magnet. The permanent magnet may then be caused to perform the desired scanning, for example, it may be caused to follow a circular path and because of its coupling to the photo sensitive device the device also scans the same path. The motion of the photo sensitive device may then cause scanning of the surface when the magnet is moved in its desired path by the introduction of varying magnetic fields in the vicinity of the magnet.

A clearer understanding of my invention may be had from a consideration of the following specification and drawings in which the FIGURE 1 is a cross-sectional view of the essential elements of a scanner in accordance with my invention;

FIGURE 2 is a plan view of FIGURE 1 along section II—II;

FIGURE 3 is a schematic electrical diagram indicating the electrical arrangement of the coils shown in FIGURES 1 and 2;

FIGURE 4 is an alternative electrical diagram which may also be utilized to replace a portion of the figure shown in FIGURE 3;

FIGURE 5 is an alternative form of construction of the scanner; and

FIG. 6 is a block diagram illustrating the use of the scanner according to this invention.

Considering first FIGURE 1, there is shown photoelectric device 10 mounted on a permanent magnet 11, preferably the photoelectric device is a photo conductive element since these elements are available in smaller sizes than some of the photo emissive elements. Since the spot scanned is determined by the area of the photo sensitive surface, it is necessary that the photo sensitive device itself have a very small sensitive area to scan a very small spot. It is usual that the photoconductive element is mounted in an insulating material and provided with a pair of leads such as leads 12 and 13. It will be noted that the permanent magnet 11 is magnetized in what will be referred to as an axial direction, the magnet itself being shown as cylindrical with the north pole at the top and the south pole at the bottom.

The material for this magnet is preferably one of the ceramic magnetic materials since the amount of flux available from such magnets is much greater than the flux available from most metallic materials.

The magnet and scanning elements are mounted on a steel tube 14 by means of a mounting device 15 which may be made of any suitable insulating material. Lead 13 passes through the center of the tube 14 and the other lead 12 is connected to the tube 14. Since the inner-conductor 13 is insulated, the tube and conductor form a coaxial line. The assembly 10, 11 and 15 must be adequately bonded together to insure that all parts are rigidly connected and the internal spaces may, if desired, be filled with some suitable compound which will insulate the various parts and increase the rigidity and solidity of the assembly.

The lower end of the steel tube 14 expands into a mounting device 16 and in the centre of this mounting device is mounted a terminal 17 insulated from the device by insulator 18. Lead 13 is connected to the terminal 17. The mounting device for the scanning assembly is fastened by means of mounting 16 to a suitable support 50 (FIG. 6). On the same support are mounted the electromagnets, only two of which are shown in FIGURE 1 but it will be seen in FIGURE 2 that four are used. Each electromagnet comprises a pair of poles pieces 19 and 20, joined by a pin also of magnetic material, 21, on which is mounted a coil 22 suitably insulated from the pole piece by means of an insulator 23.

As will be seen from FIGURE 2, for the sake of clarity, the same parts on the electromagnets are given the same designation on each electromagnet except they are identified as 19A, 19B, and 19C, for example when referring to the pole pieces or 22A, 22B, 22C, when referring to the coils. To the coil of each electromagnet is connected a pair of leads. Coil 22 for example has leads 24 and 25. Coil 22A has leads 26 and 27. Coil 22B has leads 28 and 29. Coil 22C has leads 30 and 31.

Considering now FIGURE 3, which is a schematic diagram of the circuit arrangement for the coils of the electromagnets, it will be seen that coil 22 is connected in series with coil 22B and coil 22A is connected in series with coil 22C. Terminals 28 and 31 of coils 22B and 22C are connected together and connected to terminal 32. Terminal 27 of coil 22A is connected to terminal 33. Terminal 25 of coil 22 is also connected to the terminal 33, but through condenser 34. If an alternating current is applied to terminals 32 and 33, and condenser 34 is suitably selected in accordance with the impedance of coils 22A, B, and C, the result will be a rotating magnetic field equivalent to the rotation of a north pole and a south pole around a circle defined by the centre point of the poles of the electromagnets. In operation condenser 34 is selected such that at the frequency supplied to terminals 32 and 33 the current flowing through the coils 22 and 22B is 90° in advance of the current flowing through coils 22A and 22C; as has been pointed out previously this produces a rotating magnetic field.

Looking now at FIGURE 1 it will be seen that if pole 19 is a south pole, pole 20 must be a north pole, thus attracting magnet 11. Simultaneously, pole 19B is a north pole and pole 20B is a south pole, thus repelling magnet 11. When the current reverses in phase, poles 19B and 20B attract the magnet 11 and at an intermediate time between attraction to poles 19 and 19B, the magnet will be attracted to pole 19A. Since the magnet is mounted on the end of the steel tube 14, and this steel tube is resilient, the magnet will be permitted to move in a circular path following the rotating magnetic field. As the magnet rotates, it carries with it, the photo sensitive device 10. By proper selection of the forces produced by the electromagnet, the permanent magnet 11 will move in a circular path. The magnet 11 may be described as having swiveling motion and the photosensitive device moves correspondingly. It will be appreciated that the selection of the magnetic force will be dependent upon the mechanical structure of the magnet and photo sensitive device and its resilient support together with the strength of the magnet used. If the photoelectric device is permitted to scan over an area bearing for example a line of different reflecting quality, and the area is illuminated, the variations in reflectivity of the surface may be detected at terminals 17 and 16, and utlized as described in Patent 3,017,552 to control a line following device.

When the scanning circle, that is the circle described by the photo sensitive device intersects a line the signal derived from terminals 16 and 17 will contain two components one component having the same frequency as the frequency of rotation of the scanning device and a second frequency double the frequency of the scanning device. The phase of the signal having a frequency twice the freqency of scanning will indicate the direction of the line relative to a reference line, for example, a reference line joining any opposite pair of electromagnet poles. The amplitude of the signal having a characteristic frequency the same as the frequency of rotation of scanning will indicate the displacement of the centre of scan relative to the centre of the line scan. A further explanation of the derivation of these signals, their characteristics, and their utilization may be had from the previously referred to application. Also from the foregoing application it will be noted that at times it is desirable to rotate the absolute direction of the reference line with reference to the supplied frequency. This may be done by an actual physical rotation of the poles, that is the electromagnet pole pieces 22A, B, and C, or alternatively it may be produced by an equivalent change provided by circuits shown in FIGURE 4.

In this figure, a resolver, 35 is provided with a pair of stator windings, 36 and 37. These stator windings are at right angles to each other. It is also provided with a pair of rotor windings, 38 and 39. Stator windings 36 and 37 are connected to an effective two-phase supply which is provided similar to the manner shown in FIGURE 3 by connecting one stator winding across the supply terminals and the other stator winding across the supply terminals in series with a condenser 40. Terminal 41 of the resolver rotor is connected to terminals 28 and 31 of the electromagnets. Terminal 42 of the resolver rotor is connected to terminal 27 of the electromagnets and terminal 43 of the resolver rotor is connected to terminal 25 of the electromagnet. Terminals 24, 26, 29, and 30 are connected as previously shown in FIGURE 3. A resolver such as resolver 35 if supplied with a two-phase supply produces a rotating field and the rotor picks up this rotating field and converts it into a two-phase supply. The phase relationship, however, between the two-phase supply applied to the stator and the two-phase supply derived from the rotor is determined by the relative mechanical positions of the rotor and the stator.

It will be appreciated therefore that the phase relationship between the output at terminals 41, 42, and 43 be determined by the mechanical position of the rotor of the stator relative to the stator of the resolver. Thus the phase of the output on terminals 41, 42, and 43 relative to the supply is fully adjustable by means of mechanical adjustment of the rotor of the resolver.

FIGURE 5 illustrates an alternative form of resilient mounting for the photo sensitive device. In this case, the photo sensitive device 10 is mounted at the opposite end of a lever from the magnet 11. The lever 45 is mounted at a point intermediate to ends, in a resilient diaphragm 46. As before, series of electromagnets surround the permanent magnet 11. The operation of the device as shown in FIGURE 5 is identical with the operation of the device illustrated in the previous figures except that the mounting of the photo sensitive device is resilient by virtue of the resilient diaphragm 46 and the photo sensitive device is remote from the magnet 11. The magnet 11 has swiveling motion about its region of support through the diaphragm 46. Under some circumstances, the mounting intermediate device 10 and the magnet 11 may be convenient where it is desired to produce a mechanical amplification between the motion of the magnet 11 and the motion of the photo sensitive device 10, obviously by adjustment of the point of suspension the circle described by the photo sensitive device 10 may be greater or smaller than the circle described by the magnet 11. The resilient diaphragm 46 may be mounted by means of a ring 47 on a mounting structure which also supports the electromagnets in a manner very similar to the mounting of the magnets in FIGURE 1.

In FIGURE 6 there is shown a line tracing system utilizing my invention, portions of this system are shown schematically, while the scanning device is shown in section and other portions are shown isometrically. In this figure the scanning device which bears the same designations as utlized in FIGURE 1 is illustrated with its elements mounted in a tube 50 whose ends are partially closed, one end closure serving as a support for the steel rod 14 and the other end closure serving as a support for the electromagnets. The tube itself is mounted for rectangular co-ordinate motion in a frame 51. X-motor 52 drives the scanning unit by means of a worm drive, in a straight line and in a plane parallel to the plane of the frame. Y-motor 53 drives the frame in a plane parallel to the first-mentioned plane and in a straight line at right angles to the direction of drive of X-motor 52, thus by driving motor 52 or 53, the scanning device may be moved anywhere within the limits of drive of the motors to a specific co-ordinate position in rectangular co-ordinate system. Below the scanning device is a projection screen made for example of frosted glass, 54. Projected onto the screen from below is a line diagram which it is desired to follow with the scanning device. This line diagram is projected from projector 55 and is a reproduction of the diagram contained within the slide holder of the projector, at 56. The photo sensitive element is connected to the preamplifier 58, through conductors 57 and 59. It will be noted that conductor 59 is connected to terminal 17. The preamplifier 58 converts the signals apperaing on terminals 16 and 17 of the scanning device into suitable electrical signals and also amplifies them. The output from this preamplifier is then divided into two portions by means of filters 60 and 61. Filter 60 selects the portion of the signal consisting of a frequency $2f$ where $f$ is the supply frequency applied to terminals 32 and 33. This may be accomplished either by selection of $2f$ or by the rejection of all frequencies below $2f$. Filter 61 selects the component containing frequency equal to $f$. This may be accomplished by rejecting all frequencies above $f$ for example.

The output from filter 60 goes to phase discriminator 62. Also applied to phase discriminator 62 is a signal from multiplier 63. The output of multiplier 63 is a constant signal having a frequency 2f. The output from discriminator 62 is a direct current whose amplitude is proportional to phase displacement of the 2f signal from 60 versus the 2f signal from 63.

The direction of phase relationship determines the polarity of signal from discriminator 62 while the amplitude of phase displacement determines the amplitude of the signal from 62. This reversible D.C. potential is amplified by amplifiers 64 and applied to D.C. servo-motor 65 causing the servo-motor to rotate with a direction and velocity dependent upon the amplitude and polarity of the signal from amplifier 64.

The output from filter 61 is applied to the phase sensitive amplitude detector 66. The output from this detector is a direct current output, the input signal from 61 being compared to the frequency f from the supply 32 and 33. The polarity of the output signal is dependent upon the phase relationship between the signal from the supply and the signal from filter 61, both signals having frequency f. The amplitude of the output from 66 is dependent upon the amplitude of the signal from filter 61. This D.C. potential is amplified by amplifier 67 and applied to one winding of the stator of resolver 68. The other winding of the stator of resolver 68 is supplied with a direct current from D.C. source 69 via potentiometer 70. Adjustment of the slider of potentiometer 70 determines the D.C. input to this winding of the resolver. The rotor of the resolver is mounted on the same shaft as the shaft of servo-motor 65, therefore the rotor position of servo-motor 65 determines the rotor position of resolver 68.

The outputs from the rotor of resolver 68 are applied to motors 52 and 53 that is one winding of the rotor of resolver 68 is connected, either directly or through an amplifier as required, to motor 52. The other winding of the rotor which is at right angles to the first winding is connected to motor 53, also through an amplifier if required.

Also on the same shaft as a resolver 68 rotor, is the rotor of resolver 35 which is the rotor referred to in FIGURE 4. It will be noted that the stator of this resolver is again supplied with frequency f from terminals 32 and 33 and one of the rotor coils is supplied through a condenser 40. The output from the resolver rotor appears at terminals 41, 42, and 43 which bear the same designations as the terminals in FIGURE 4, and these terminals are connected to terminals 25, 27, 31, and 28 of the electromagnets as designated in FIGURE 3.

In operation the 2f signal from filter 60 when compared in phase with the 2f signal from multiplier 63 produces a reversible D.C. output which causes the servo-motor 65 to rotate with a direction and speed dependent on the polarity of amplitude of the signal. This rotation of the servo-motor is equivalent to a rotation of the reference line in the scanning device and it adjusts the position of photo sensitive device 10 in its circular path relative to the phase of supply 32 and 33. As long as signal is applied to amplifier 64 and hence to servo-motor 65 the motor rotates, it will continue rotation until the direction of the line projected on screen 54 has a certain specific relationship to the rotational path of element 10. If it is assumed that the reference line referred to is aligned with the projected line when there is no signal from amplifier 64, then it will be found that at all times servo-motor 65 tends to rotate until the reference line is parallel to the projected line. At the same time the output from detector 66 represents the perpendicular displacement of the center of rotation of the scanning device 10 relative to the line being followed. A perpendicular distance in one direction will cause an output from amplifier 66 of an amount proportional to the perpendicular direction and having a polarity dependent upon the direction of the perpendicular. This signal being applied to one of the stator windings of resolver 68 produces a co-ordinate signal repre-sensative of the necessary motion of the scanning device in that co-ordinate direction to cause the center of the scanning circle to move directly over the line being traced.

The signal from potentiometer 70 determines the velocity with which the tracer proceeds along parallel to the line. These two components are then resolved in the X and Y directions by the resolver 68 and the resultant applied to the X and Y drive motors, which then cause the centre of rotation of the scanning device to move in such a direction that it is directly over the line being scanned and proceed along the line being scanned with a velocity determined by the adjustment of the potentiometer 70.

A clearer understanding of the operation of this system will be had with reference to the previously referred to application.

I claim as my invention:

1. A photoelectric scanning device comprising a beam, means mechanically securing said beam for swiveling motion about a region of said beam, points of said beam displaced from said region being laterally displaceable, a photosensitive element connected to said beam at a position thereof which is laterally displaceable by said swiveling motion, said element being in position to receive light transmitted generally axially of said beam, magnet means, having opposite north and south poles, connected to said beam at a position which is laterally displaceable, the magnetic axis between the poles of said magnet means being essentially aligned with the axis of said beam, and means magnetically coupled to said magnet means to produce varying periodic magnetic forces to displace said magnet means and said element periodically about the undisplaced position of said beam, said force-producing means producing magnetic forces generally at right angles to the magnetic axis of said magnet means and said forces being at an angle to each other and being produced to vary in displaced-time relationship so that said magnet means and said element trace a rotating path defining within it an area of appreciable magnitude.

2. The device of claim 1 wherein the beam is secured near one of its ends, the magnet means is suspended near the opposite end of said beam and the photosensitive element is suspended from the magnet means.

3. The device of claim 1 wherein the beam is secured intermediate its ends, the magnet means is connected near one end of the beam and the photosensitive element is connected near the other end of said beam.

4. A photoelectric scanning device comprising a beam, means mechanically securing said beam for swiveling motion about a region thereof, points of said beam displaced from said region being laterally displaceable, a photosensitive element connected to said beam at a position thereof which is laterally displaceable by said swiveling motion, said element being in position to receive light transmitted generally axially of said beam, permanent magnet means, having opposite north and south poles, connected to said beam at a position which is laterally displaceable, the magnetic axis between the poles of said permanent magnet means being essentially aligned with the axis of said beam, a plurality of electromagnets each having a coil and a magnetizable core, said core having pole pieces, means mounting said electromagnets about said permanent magnet means with said pole pieces in magnetic reactive relationship with said permanent magnet means, and means connected to said coils for energizing said coils to produce a rotating magnetic field in magnetic reactive relationship with said permanent magnet means to exert magnetic forces on said permanent magnet means to rotate said permanent magnet means and said element periodically about the undisplaced position of said beam.

5. The device of claim 4 wherein the plurality of electromagnets includes at least two electromagnets with pole pieces positionally displaced about the permanent magnet means and the varying magnetic field is produced by energizing the coils of said two electromagnets with currents in time-displaced relationship.

6. The device of claim 4 wherein the plurality of electromagnets includes at least two pair of electromagnets with their pole pieces positionally displaced about the permanent magnet and wherein the varying magnetic field is produced by means connected to the coils of the electromagnets for impressing a first alternating current on the coils of one of said pairs and a second alternating current on the coils of another of said pairs, the first alternating current being displaced in phase with respect to the second alternating current.

7. A photoelectric scanning device comprising a frame, a resilient beam supported at one end in said frame, a photo sensitive element mounted on the free end of said beam, a permanent magnet mounted adjacent said free end with its magnetic axis parallel to the axis of said beam, at least two electromagnets mounted on said frame adjacent the free end of said beam arranged at different points on a circle having for its center the undeflected position of the free end of the beam and means to apply alternating current to said electromagnets.

8. A scanner comprising a permanent magnet having an opening therethrough, a tubular conductor having a longitudinal opening extending from said magnet with said longitudinal opening coextensive with the opening through said magnet, a photosensitive device mounted on said magnet, conductors connected to said photo sensitive device, one of said last-named conductors extending thru said longitudinal opening and another of said last-named conductors being connected to said tubular conductor, and electromagnetic means coupled to said magnet for imparting periodic motions to said magnet.

9. A photoelectric scanning device comprising a beam, magnet means, having opposite north and south poles, mechanically connected to said beam, the magnetic axis between the poles of said magnet means being essentially aligned with said beam, means magnetically coupled to, and magnetically interactive with, said magnet means for producing magnetic forces on said magnet means to cause said magnet means and said beam to move, said magnetic forces being generally at right angles to said beam and at an angle to each other and being produced in displaced-time relationship so that said magnet means traces a rotating path about the axis about which said magnet means and beam are moved by said magnetic forces, and a single photosensitive element mounted on said beam to move in a rotating path about said axis so that said element traces a rotating path defining within it an area of appreciable magnitude.

10. A photoelectric scanning device comprising a photosensitive element, a permanent magnet, means mounting said permanent magnet for movement, means mechanically coupling said magnet to said photosensitive element to move said element by the motion of said permanent magnet, a plurality of electromagnets encircling said magnet, the poles of said electromagnet being in magnetic-force reactive relationship with the poles of said permanent magnet, a resolver having inductively coupled rotor and stator windings, means for applying potentials out of phase with respect to each other to one of said windings to produce a rotating field, means for deriving out-of-phase potentials induced by said one of said windings in the other of said windings, from the other of said windings, said derived out-of-phase potential being displaced in phase with reference to said applied out-of-phase potential to an extent dependent on the angular position of said rotor windings, and means connecting said deriving means to said electromagnets to impress said derived out-of-phase potential on said electromagnets to subject said permanent magnet to rotating magnetic forces to rotate said magnet.

11. A photoelectric scanning device including a permanent magnet, means connected to said magnet mounting said magnet rotatably, a photosensitive element mounted rotatably with said magnet, power supply means for supplying potentials out of phase with respect to each other, means connecting to said supply means for deriving from said applied potential, derived potentials out of phase with respect to each other, said deriving means including means for setting the phase relationship of said applied and derived potentials at a predetermined magnitude over a predetermined range, and means connected to said deriving means and energizable by said derived out-of-phase potentials to impress on said magnet a rotating field to rotate said magnet, the space phase position of said rotating field being dependent on said setting of said phase relationship.

References Cited by the Examiner

UNITED STATES PATENTS

| | | | |
|---|---|---|---|
| 2,397,933 | 4/46 | Fowle et al. | 250—236 X |
| 2,609,513 | 9/52 | Boucher et al. | 250—224 |
| 2,816,705 | 12/57 | Thrall et al. | 250—239 X |
| 2,855,521 | 10/58 | Blackstone | 250—235 X |
| 2,919,358 | 12/59 | Marrison | 250—203 X |
| 2,933,612 | 4/60 | Cheverton et al. | 250—202 |
| 3,017,552 | 1/62 | Brouwer | 250—202 X |
| 3,037,888 | 6/62 | Lobosco et al. | 250—202 X |

RALPH G. NILSON, *Primary Examiner.*

RICHARD M. WOOD, WALTER STOLWEIN,
*Examiners.*